United States Patent [19]
Boileau

[11] 3,875,986
[45] Apr. 8, 1975

[54] HEAVY-DUTY RADIAL SNOW TIRE

[75] Inventor: Jacques Boileau, Clermont-Ferrand, France

[73] Assignee: Compagnie Generale des Etablissements Michelin, raison Sociale Michelin & Cie, Clermont-Ferrand, France

[22] Filed: Dec. 7, 1972

[21] Appl. No.: 312,806

[30] Foreign Application Priority Data
Dec. 17, 1971 France .................. 71.45654

[52] U.S. Cl. ............................................. 152/209 R
[51] Int. Cl. ............................................. B60c 11/04
[58] Field of Search .................... 152/209 R

[56] References Cited
UNITED STATES PATENTS

| | | | |
|---|---|---|---|
| 2,014,255 | 2/1934 | King | 152/209 R |
| 3,512,566 | 5/1970 | Verdier | 152/209 R |
| 3,512,567 | 5/1970 | Verdier | 152/209 R |
| D187,575 | 3/1960 | Caurette | 152/209 R |

FOREIGN PATENTS OR APPLICATIONS

| | | | |
|---|---|---|---|
| 332,695 | 9/1958 | Denmark | 152/209 R |
| 755,137 | 8/1956 | United Kingdom | 152/209 R |
| 744,448 | 2/1956 | United Kingdom | 152/209 R |
| 969,355 | 9/1964 | United Kingdom | 152/209 R |
| 2,029,844 | 12/1970 | Germany | 152/209 R |

*Primary Examiner*—Albert J. Makay
*Assistant Examiner*—Kenneth Noland
*Attorney, Agent, or Firm*—Brumbaugh, Graves, Donohue & Raymond

[57] ABSTRACT

The tread of a heavy-duty radial snow tire is formed with (1) transverse zigzag grooves extending from one edge of the tread to the other and spaced apart at regular intervals in the longitudinal direction and (2) substantially longitudinal linear grooves connecting adjacent transverse grooves. The transverse and longitudinal grooves together define an array of isolated blocks. The longitudinal grooves are spaced apart at regular intervals in a succession of transverse rows but are staggered on opposite sides of each transverse groove at intervals that are alternately relatively large and relatively small, so that, except for alternate blocks at the edges of the tread, each block is overlapped by the longitudinally adjacent blocks over unequal fractions of its transverse dimension, one fraction being at least twice the other.

4 Claims, 4 Drawing Figures

HEAVY-DUTY RADIAL SNOW TIRE

BACKGROUND OF THE INVENTION

This invention relates to radial snow tires having a novel and highly-effective tread design and adapted particularly for use on heavy vehicles (buses, trucks, etc.).

It is conventional practice to form the tread of a snow tire in staggered, isolated blocks. Typically, transverse zigzag grooves extend from one edge of the tread to the other and follow each other in the longitudinal direction at substantially uniform intervals; and substantially longitudinal linear grooves connect the transverse grooves in pairs and follow each other in the transverse direction at substantially uniform intervals, but are staggered on opposite sides of each transverse groove by approximately one-half of the transverse distance between the longitudinal grooves.

This arrangement provides good adherence on snow, provided that the transverse and longitudinal grooves have a rather considerable width. Under these conditions, however, the blocks have a tendency to become worn more in the vicinity of the longitudinal grooves than at a distance from the longitudinal grooves. If an attempt is made to remedy this selective wear near the longitudinal grooves by reducing their width, another problem is presented, namely that the snow has a tendency to be held in and to permanently plug these grooves, and the adherence decreases.

SUMMARY OF THE INVENTION

An object of the invention is to provide a solution to the problems outlined above and, in particular, to improve both the adherence and the resistance to wear of the tread of a snow tire. Another object is to facilitate the evacuation of the snow filling the tread grooves, even in the case of relatively narrow grooves, and even in the case of tires for heavy vehicles. As is known, tires supporting heavy vehicles exert a much greater pressure on the ground than tires for light vehicles (such as automobiles). This leads to a compacting of the snow that makes its removal difficult.

The foregoing and other objects are attained in accordance with the invention by providing a radial snow tire having a tread formed with (1) zigzag transverse grooves extending in staggered blocks from one edge to the other of the tread and following each other in the longitudinal direction at uniform intervals, and (2) substantially longitudinal linear grooves connecting adjacent transverse grooves and following each other in the transverse direction at substantially uniform intervals. The tire is characterized in that the longitudinal grooves are staggered on opposite sides of each transverse groove in a very asymmetrical fashion, so that, except for alternate blocks at the edges of the tread, each block defined by two transverse grooves and two longitudinal grooves is overlapped by the longitudinally adjacent blocks over fractions of its transverse dimension, one of which is greater than the other, and even two or more times the other.

Preferably, each block overlaps the adjacent blocks over a fraction exceeding on one side 60% and over a fraction not exceeding on the other side 20% of the transverse dimension of the block.

Preferably also:

a. the width of the longitudinal grooves is less than that of the transverse grooves bordering each block;

b. the angle made by the walls of the grooves with the perpendicular to the surface of the tread is larger for the transverse grooves than for the longitudinal grooves (this angle may furthermore be larger on one side of the longitudinal grooves than on the other); and c. the corners of the blocks at the intersection of the transverse grooves and of the longitudinal grooves all form angles greater than 90°, these corners being blunted if desired.

The effect of the features described above can be explained as follows:

Each block, being elongated in the transverse direction, has one transverse end which is more mobile than the other, since much less deeply imbricated in the blocks of the adjacent rows. Furthermore, the two blocks which face each other on opposite sides of the same longitudinal groove are arranged in such a manner that the more mobile end of one is opposite the less mobile end of the other, which facilitates a relative displacement of these two ends as the tire rolls. As a small angle of inclination of groove wall with respect to the perpendicular to the tread surface gives greater mobility than a large angle of inclination, the difference in mobility of ends of blocks adjoining a longitudinal groove is accentuated by the selection of asymmetric cross-sections for these longitudinal grooves.

The various measures described above, including the differential mobility of the walls of the longitudinal grooves, thus have the effect of facilitating the evacuation of the snow caught in the longitudinal grooves. The increase in mobility of the blocks limited to one of their ends makes it possible to use adjacent longitudinal grooves of reduced width as compared with the width which would be necessary to evacuate the snow with blocks having two mobile ends (which can move together, reducing or eliminating the relative movement). The reduction of width of the grooves in turn increases the resistance to wear.

BRIEF DESCRIPTION OF THE DRAWINGS

An understanding of other aspects of the invention can be gained from the following detailed description of the preferred embodiments thereof, in conjunction with the appended figures of the drawing, wherein.

DESCRIPTION OF THE PREFERRED EMBODIMENTS

Figure 1:
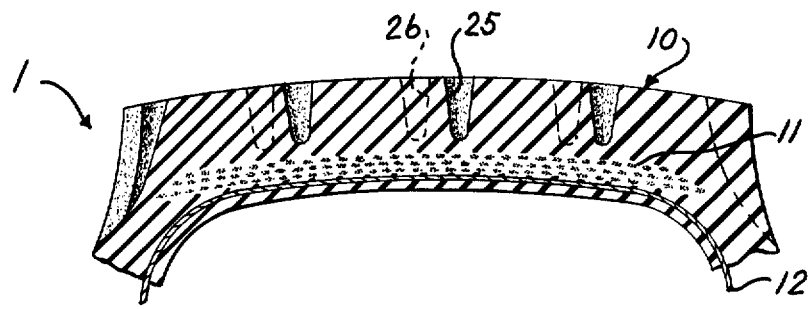
FIG. 1 is a fragmentary view in radial section, along the line I—I of FIG. 2, and looking in the direction of the arrows, of a tire having a tread in accordance with the invention.

FIG. 1 shows in fragmentary radial section a tire 1 of size 11.00–20 formed with a tread 10 in accordance with the invention. The tread 10 is superimposed on a tread reinforcement 11 comprising a plurality of plies of steel cords. The tread reinforcement 11 is superimposed on a carcass 12 comprising radially arranged steel cords.

Figure 2:
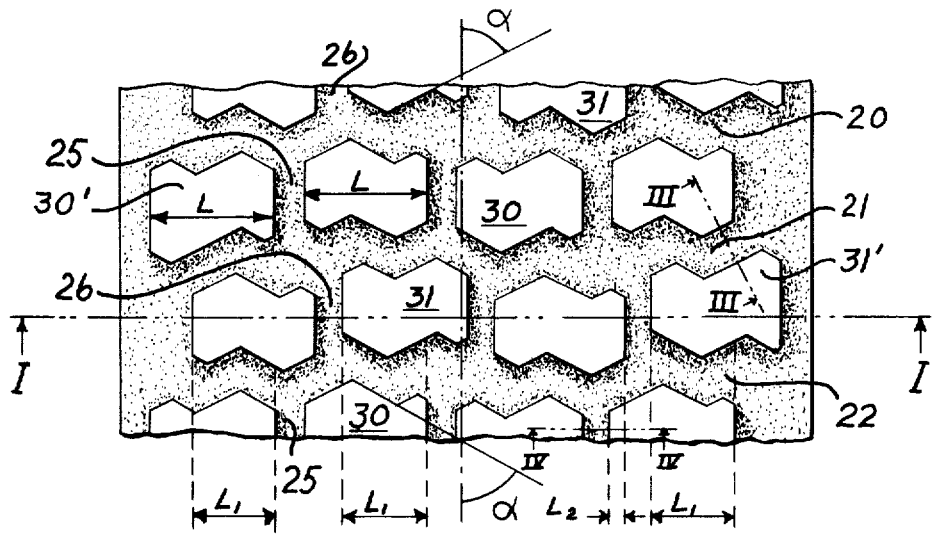
FIG. 2 is a plan view of a sector of the same tread.

FIG. 2 shows that the tread 10 is cut by equidistant zigzag transverse grooves 20, 21, 22, by longitudinal grooves 25 connecting the adjacent transverse grooves 20 and 21, and by longitudinal grooves 26 connecting the adjacent transverse grooves 21 and 22. The grooves define blocks 30 arranged between the grooves 20 and 21 and separated by the grooves 25, and blocks 31 arranged between the grooves 21 and 22 and separated by the grooves 26. All the blocks 30 and 31 have substantially the same transverse dimension L. Except for alternate blocks 30' and 31' at the edges of the tread, each block 30 (or 31) comprises two portions of transverse dimensions $L_1$ and $L_2$ which are overlapped by the blocks 31 (or 30) of the longitudinally adjacent row. As shown in the drawing, in accordance with the invention, the larger dimension $L_1$ is a multiple of the smaller dimension $L_2$. This is due to an asymmetric transverse shifting of the longitudinal grooves 25 and 26.

In one exemplary embodiment of the invention, the dimension L is 42 mm, the dimension $L_1$ 28 mm, and the dimension $L_2$ 5 mm. $L_1$ is thus more than five times $L_2$. The grooves 25 and 26 moreover have a width of 9 mm, while the transverse grooves 20, 21, 22 have a minimum width of 12.5 mm.

Figure 3:
FIG. 3 is a sectional view of a transverse groove along the line III—III of FIG. 2 and looking in the direction of the arrows.

FIG. 3 shows that the transverse groove 21 has walls which are more inclined to the perpendicular to the surface of the tread than are the walls of the longitudinal groove 26 (shown in dashed line for purposes of comparison). The same is true of the walls of the transverse grooves 20 and 22 with respect to those of the longitudinal grooves 25.

Figure 4:
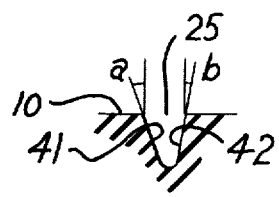
FIG. 4 is a sectional view of an alternate embodiment of a longitudinal groove along the line IV—IV of FIG. 2 and looking in the direction of the arrows.

FIG. 4 shows a preferred embodiment of a longitudinal groove, such as 25, between two adjacent blocks, such as 30, of one and the same row. In this particular form, the side walls 41 and 42 of these blocks located opposite each other form different angles with the perpendicular to the surface of the tread 10: the wall 41 of the part of the block overlapped over a relatively large length by a block, such as 31, of the following row forms with the perpendicular a relatively large angle $a$; while the wall 42 of the portion of the adjacent block 30 overlapped over a relatively small length by the same block 31 forms with the perpendicular a relatively small angle $b$.

Finally, in FIG. 2 it can be noted that the corners of the blocks 30 and 31 are blunted at the place where the grooves 25 or 26 and the grooves 20, 21 and 22 meet. The sides of the blocks 30, 31 are parallel to only three directions, namely the longitudinal direction, the transverse direction and a direction forming a angle $\alpha$ of ± 62°30' with the longitudinal direction.

Thus there is provided in accordance with the invention a novel and highly-effective radial snow tire particularly adapted for use on heavy vehicles. Many modifications of the representative embodiment disclosed herein will readily occur to those skilled in the art. Accordingly, the invention is not limited except by the appended claims:

I claim:

1. A radial snow tire for heavy vehicles comprising a tread formed with (1) transverse zigzag grooves extending from one edge of the tread to the other and spaced apart at regular intervals in the longitudinal direction and (2) substantially longitudinal linear grooves connecting adjacent transverse grooves and having a width less than that of the transverse grooves, the transverse and longitudinal grooves together defining an array of isolated blocks and the longitudinal grooves being spaced apart at regular intervals in a succession of transverse rows but being staggered on opposite sides of each transverse groove in an asymmetrical fashion, so that, except for alternate blocks at the edges of the tread, each block is overlapped by the longitudinally adjacent blocks over unequal fractions of its transverse dimension, one fraction being at least twice the other, the walls of the longitudinal grooves forming angles with the perpendicular to the tread surface smaller than the angles formed by the walls of the transverse grooves with the perpendicular to the tread surface, and, in the case of each block except alternate blocks at the edges of the tread, the end overlapped by the larger fraction of the transverse dimension of such block including a wall forming with the perpendicular to the tread surface an angle $a$, and the end overlapped by the smaller fraction of the transverse dimension of such block including a wall forming with the perpendicular to the tread surface an angle $b$, the angle $a$ being larger than the angle $b$.

2. A tire according to claim 1, wherein said one fraction exceeds 60% and said other fraction does not exceed 20%.

3. A tire according to claim 1, wherein the blocks have a larger dimension L in the transverse than in the longitudinal direction.

4. A tire according to claim 1, wherein each block further has generally longitudinally-extending edges spaced apart transversely, all of the edges of each block being parallel to only three directions.

* * * * *